(12) United States Patent
Abe et al.

(10) Patent No.: US 6,681,074 B1
(45) Date of Patent: Jan. 20, 2004

(54) METHOD FOR PRODUCING BASE MATERIAL FOR OPTICAL FIBER HAVING DEFORMED FIRST CLAD, BASE MATERIAL FOR OPTICAL FIBER AND OPTICAL FIBER

(75) Inventors: Jun Abe, Annaka (JP); Nobuyasu Mantoku, Annaka (JP); Shinji Makikawa, Annaka (JP); Seiki Ejima, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 258 days.

(21) Appl. No.: 09/670,019

(22) Filed: Sep. 26, 2000

(30) Foreign Application Priority Data

Oct. 8, 1999 (JP) .......................... 11-287810

(51) Int. Cl.$^7$ ................................. G02B 6/28
(52) U.S. Cl. ...................... 385/141; 385/144
(58) Field of Search ................. 385/141, 144; 65/414, 415, 416

(56) References Cited

U.S. PATENT DOCUMENTS

| | | | |
|---|---|---|---|
| 5,217,516 A | * | 6/1993 | Ishiguro et al. ............... 65/3.11 |
| 5,259,059 A | | 11/1993 | Abramov |
| 5,473,622 A | | 12/1995 | Grubb |
| 5,530,709 A | | 6/1996 | Waarts et al. |
| 5,864,645 A | | 1/1999 | Zellmer |
| 5,877,890 A | | 3/1999 | Snitzer |
| 6,145,344 A | * | 11/2000 | Oyamada et al. ............ 65/414 |
| 6,233,386 B1 | * | 5/2001 | Paek et al. .................. 385/123 |

FOREIGN PATENT DOCUMENTS

| | | |
|---|---|---|
| DE | 19535526 C1 | 4/1997 |
| EP | 0 776 074 A2 | 5/1997 |
| GB | 2 205 828 A | 12/1988 |
| JP | 11-52162 | 2/1999 |
| JP | 11-72629 | 3/1999 |
| WO | WO 93/15536 | 8/1993 |
| WO | WO 98/36477 | 8/1998 |

* cited by examiner

Primary Examiner—Scott J. Sugarman
Assistant Examiner—Richard Hanig
(74) Attorney, Agent, or Firm—Oliff & Berridge, PLC

(57) ABSTRACT

There is disclosed a method for producing a base material for optical fiber having a deformed first clad consisting of at least a core, a first clad and a second clad, comprising a step of deforming a shape of a section of the first clad so that it may have at least one linear part when the first clad is formed around the core, a step of depositing porous glass fine particles as the second clad made of the same material as that of the first clad on a glass rod having the deformed first clad to form a porous glass base material, and a step of forming the second clad having a round section by vitrifying it. There can be provided a method for producing a base material for optical fiber wherein a lot of breakages or cracks on the surface of the base material can be prevented in a step of depositing porous glass fine particles for the second clad on the first clad, and base material for optical fiber having no defects, and an optical fiber having an efficient effect of being excited with excitation light.

3 Claims, 1 Drawing Sheet

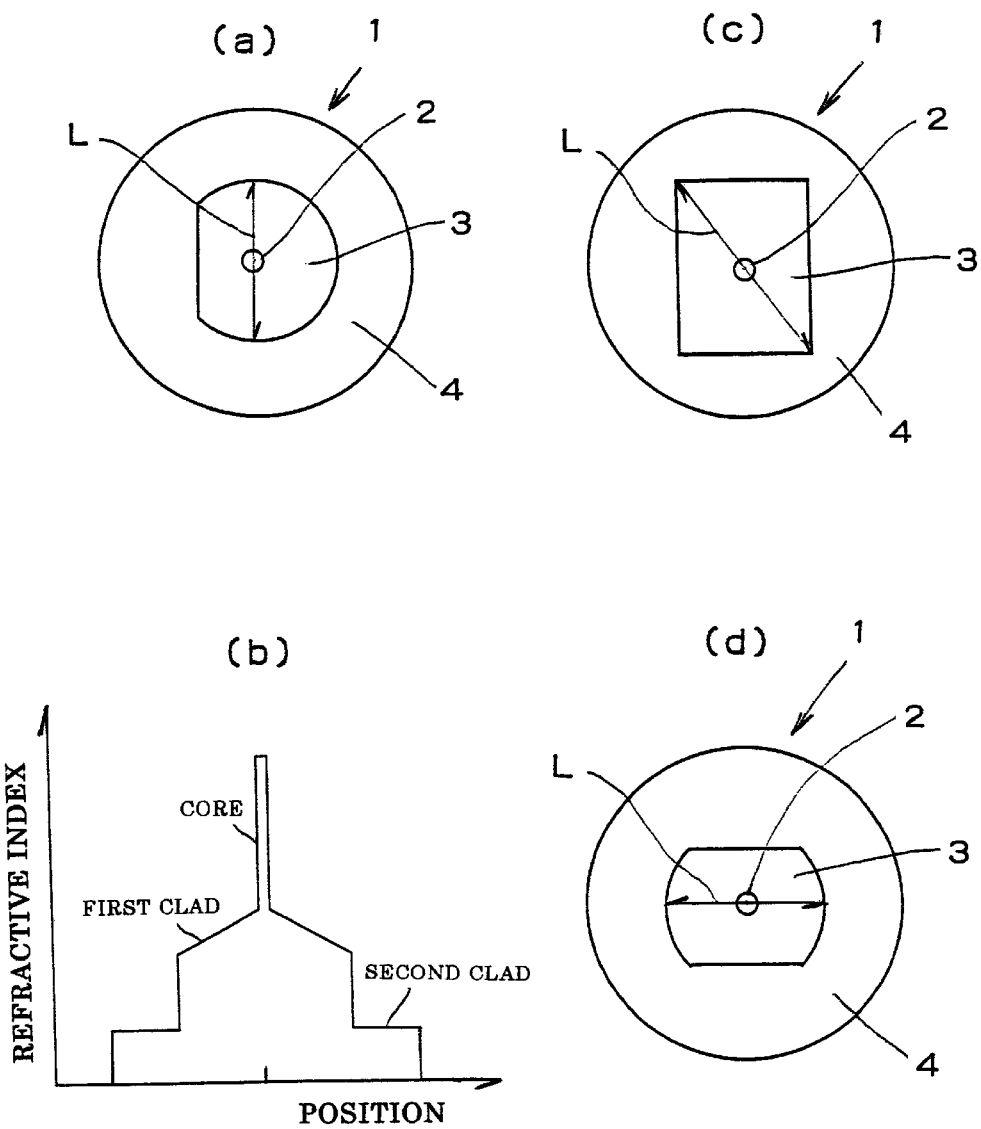

METHOD FOR PRODUCING BASE MATERIAL FOR OPTICAL FIBER HAVING DEFORMED FIRST CLAD, BASE MATERIAL FOR OPTICAL FIBER AND OPTICAL FIBER

BACKGROUND OF INVENTION

1. Field of the Invention

The present invention mainly relates to an optical fiber for amplification that corresponds to tendency of being high-powered of a light amplifier or a fiber laser, an base material for optical fiber that is a material therefor, and a method for producing it.

2. Description of the Related Art

Recently, a light amplifier for system construction of DWDM (Dense Wavelength Division Multiplexing) has been strongly required to be high-power. Furthermore, there has been required high-power also in the field of fiber laser. In both cases, excitation light is introduced in quartz optical fiber wherein rare earth element is doped in the core, and emission of the rare earth element is used, and it is necessary for achievement of high-power to excite the core with the excitation light efficiently.

Recently, there was proposed a method called clad pumping for the purpose as described above (Japanese Patent Application Laid-open (kokai) No. 11-72629).

There is disclosed in Japanese Patent Application Laid-open (kokai) No. 11-52162 a double core type optical fiber for amplification wherein a second core is formed around a first core. In the optical fiber, for example, a heterogeneous part wherein a refractive index is different from the second core is formed, a part of the periphery of the second core is cut out, or the periphery is formed in polygonal shape, as scattering means for scattering the light that does not contribute to excitation of a signal light incident upon the first core among the excitation light incident upon the second core so that it may cross with the first core as possible. In order to produce such an optical fiber, the second core is formed around the first core by sooting to form a sintered glass, a part of the periphery is then cut out, and it is then coated with plastic with being wiredrawn to form a clad. An optical fiber for amplification is thereby produced.

In that case, the shape of the section of the second core (that corresponds to the first clad of the present invention) can be a deformed shape other than circle (D-shape, polygonal shape, drum shape), and quartz glass fine particles made of the same material as the second core can be formed by sooting thereon, to be deposited so that a shape of the section can be round. However, it was quite difficult to realize it for a problem in production thereof. Namely, breakages or cracks often occur on the surface of the base material in a process of cooling the porous quartz glass base material that is formed by sooting on the second core having a deformed shape, resulting in reduction of yield of the base material, and lowering of productivity. Accordingly, in most cases, polymer clad, for example those made of low refractive index polymer such as fluorinated acrylic acid, urethane acrylate, PMMA has been adopted as a clad, and the second core having a deformed shape has been coated with such plastics with being wiredrawn, to form a clad. However, there is a problem in production that not only wiredrawing of base material, but also a coating process, and a drying process are necessary in order to produce a polymer clad. Furthermore, there are problems in quality, such as bad adhesion property with the second core, difficulty in controlling a refractive index, low resistance to deterioration, low mechanical strength. Accordingly, there is a strong need for a quartz glass clad having excellent resistance to deterioration and stable properties.

SUMMARY OF THE INVENTION

The present invention has been accomplished to solve the above-mentioned problems, and a main object of the present invention is to provide a method for producing a base material for optical fiber wherein a lot of breakages or cracks on the surface of the base material can be prevented in a step of depositing porous glass fine particles for the second clad on a glass rod having a deformed first clad and cooling it, and base material for optical fiber having no defects, and an optical fiber having an efficient effect of being excited with excitation light.

In order to achieve the above-mentioned object, the present invention provides a method for producing a base material for optical fiber having a deformed first clad comprising at least a core, a first clad and a second clad comprising a step of deforming a shape of a section of the first clad so that it may have at least one linear part when the first clad is formed around the core, a step of depositing porous glass fine particles as the second clad made of the same material as that of the first clad on a glass rod having the deformed first clad to form a porous glass base material, and a step of forming the second clad having a round section by vitrifying it.

If the base material for optical fiber is produced according to the above-mentioned method, especially breakage and cracks that are liable to be formed in the step of forming the second clad by depositing porous glass fine particles on a glass rod having a deformed shape of a section can be prevented, so that a base material for an optical fiber having the second clad having no defect and the deformed first clad can be produced in high yield, and in high productivity. Furthermore, since the deformed shape is introduced into the section of the first clad, efficient incidence of the excitation light can be enabled, optical fibers wherein output light is increased can be produced. Moreover, since the deformed first clad and the second clad are made of the same material, the optical fiber having a stable refractive index distribution and excellent resistance to deterioration can be produced.

In that case, a length of the longest part of the deformed section of the glass rod having the first clad is preferably 15 mm or less.

As described above, if the length of the longest part of the deformed section of the glass rod having the deformed first clad that is to be a target is 15 mm or less in production of a porous glass base material by axially depositing porous glass fine particles on the glass rod having a deformed first clad, breakage and crack on the surface of the base material that are liable to occur in a cooling step after deposition can be prevented almost completely, so that the optical fiber having the second clad with no defects and the deformed first clad can be produced.

The present invention also provides a base material for optical fiber having a deformed first clad produced by the method described above. The optical fiber is a base material having a high quality wherein there is no defect such as breakage, crack or the like, particularly on the surface of the base material that is to be a front surface of the second clad. Since the deformed first clad having a deformed section with at least one linear part is formed, efficient incidence of excitation light is possible through the base material, so that an optical fiber that can emit high power light can be produced.

The present invention also provides a quartz base material for an optical fiber consisting of at least three refractive index area, namely a core, a deformed first clad and a second clad wherein section of the first clad has a deformed shape with at least one linear part and the second clad has a round section, and the main material of the first clad and the second clad are the same.

Using the base material for optical fiber having a deformed first clad with the above mentioned constitution, optical fiber wherein excitation light efficiently exciting the signal light incident on the core through the base material can be incident can be produced by wiredrawing. As a result, high-power can be achieved in a light amplifier or a fiber laser.

In that case, the shape of the section can be D-shape, a square shape or a drum shape.

When the shape of the section is the above mentioned shape, excitation efficiency of exciting light for exciting a signal light can be increased.

In that case, it is preferable that the refractive index of the first clad is distributed so that it may gradually decreases from the center to the periphery. Thereby, it is possible to make the excitation light concentrate at the core that is a center of the fiber, so that excitation efficiency can be further improved.

The present invention also provides an optical fiber having a deformed first clad produced by wiredrawing the base material for optical fiber described above. As described above, the optical fiber having a deformed first clad produced by wiredrawing the base material for optical fiber of the present invention is an optical fiber for light amplification that has no defects such as a crack and has high performance such as high excitation efficiency. Accordingly, it can easily achieve high-power in a light amplifier and a fiber laser or the like, and has high durability.

There were problems such as breakage or cracks occurs when a glass rod having a deformed section such as D-shape is axially deposited a porous glass fine particles made of the same material. However, according to the present invention, they can be solved. Especially, they could be solved by defining a length of the longest part of the deformed section of the glass rod having a deformed first clad that is to be a target to be 15 mm or less. Accordingly, high yield and improvement in productivity can be achieved in production of the base material for optical fiber having a deformed section in a first clad, and thereby cost can be reduced.

Furthermore, since there can be produced a base material for optical fiber having a deformed first clad with no defects such as crack or the like on the surface of the second clad and the deformed first clad which are made of the same material, excitation light can be efficiently incident on a signal light incident on the core, and output light can be increased as a result, in the optical fiber produced therefrom. Thereby high-power in a light amplifier and a fiber laser can be achieved.

BRIEF DESCRIPTION OF THE DRAWINGS

FIG. 1 is a view for explanation showing the deformed section and the longest part of the deformed section of the base material for optical fiber of the present invention.

(a) D-shape section, (b) a distribution chart of refractive index on the D-shape section, (c) a square shape section, (d) a drum shape section.

DESCRIPTION OF THE INVENTION AND A PREFERRED EMBODIMENT

The present invention will be further described below in detail, but is not limited thereto.

The base material for the optical fiber having the deformed first clad of the present invention is a quartz base material for optical fiber that is a base material for optical fiber for amplifying light consisting of at least three refractive index areas, namely a core, a deformed first clad and a second clad wherein a shape of a section of the first clad is deformed so that it may have at least one linear part, the shape of the section of the second clad is round, the first clad and the second clad are made of the same main components.

Although the following explanation is conducted as for base material for optical fiber, description as for the construction and performance of the base material can also be applied to the optical fiber having a similar figure produced by wiredrawing the base material for optical fiber.

FIG. 1 is a sectional view of the base material for optical fiber having a deformed first clad of the present invention. The base material for optical fiber 1 consists of a core 2 at the center, the first clad 3 having a deformed section and the second clad 4 having a round section. The shape of the deformed section of the first clad is a deformed shape having at least one linear part. As shown in FIG. 1, examples of the deformed shape include: (a) D-shape, (c) square shape, (d) drum shape, or the like. If a mean for scattering light having a deformed shape described above is provided, light that does not pass through but crosses the core among the excitation light that is incident upon the first clad in the case that the clad has a round section can be reflected and scattered at the linear part, and cross the core to pass through. As a result, the core can be pumped and can excite a signal light efficiently.

It is possible to distribute refractive indexes of the first clad so that they can get smaller gradually form the center to the periphery. As described in FIG. 1(b), there are three refractive index areas of the core, the first clad and the second clad, and the refractive index of the core is the highest. The refractive indexes in the first clad are distributed so that they may get smaller gradually from the center to the periphery. The refractive indexes in the second clad are distributed flat.

If the refractive indexes of the first clad are distributed as described above, light gathers efficiently to the core with transmission of light, so that light can be amplified with high excitation efficiency.

According to the present invention, main components of the first clad and the second clad are the same material.

As described above, in a conventional method of producing the base material for optical fiber for light amplification having a deformed first clad, it is quite difficult to deposit quartz glass fine particles made of the same material around the first clad to form a second clad in a round shape by sooting, in the case that the sectional shape of the first clad is not round but in a deformed shape (D-shape, square shape, drum shape or the like). Furthermore, breakage or cracks often occur on the surface of the porous glass base material during a cooling process.

Accordingly, low refractive index polymer has been adopted for the clad, and a glass rod having the deformed first clad has been coated with the polymer with being wiredrawn to form the second clad. However, to produce a polymer clad, it is necessary to conduct not only wiredrawing of the base material, but also a step of coating polymer and a drying step. Furthermore, there are problems in quality such as poor adhesion property with the first clad, difficulty in controlling the refractive index, poor resistance to deterioration, and poor mechanical strength, or the like. Accordingly, there is a strong need for a quartz glass clad.

The inventors of the present invention solved the above problems, and succeed in making the first clad and the second clad of the same main components according to the following method.

The method for producing the base material for optical fiber and the optical fiber described above will be explained below. (1) In order to the base material for optical fiber, a glass rod consisting of the core and the deformed first clad is produced first by the method exemplified below. (1-1) For example, according to the VAD method, porous glass fine particles are deposited on the core rod. The resulting porous glass base material is sintered, vitrified to produce a glass rod consisting of the first clad and the core. Then, the surface of the glass rod is subjected to grinding, polishing or the like so that a desired deformed section having at least one linear part can be obtained, to produce a glass rod having the deformed first clad. (1-2) A glass rod consisting of a first clad and a core is produced by inserting a core rod in a glass tube to be the first clad, fusing them to be unified, according to a rod in tube method. Then, the surface of the glass rod was subjected to grinding, polishing or the like, so that a desired deformed section having at least one linear part can be obtained, to produce a glass rod having the deformed first clad. (1-3) The surface of the glass tube to be the first clad is subjected to grinding, polishing or the like, so that a desired deformed section having at least one linear part can be obtained. Then, a core rod is inserted in the glass tube, fused to be unified, according to a rod in tube method.

In that case, during depositing the second clad, it is preferable to make a length of the longest part of the deformed section of the glass rod having a deformed first clad to be a target 15 mm or less, especially 10 mm or less. The longest part is, for example, the longest part L of each of deformed sections (a) D-shape, (c) square shape, (d) drum shape as shown in FIG. 1.

The reason why the length of the longest part of the deformed section of the glass rod is defined as described above is that if it exceeds 15 mm, porous glass fine particles depositing layer is shrunken during cooling after deposition of the porous glass fine particles as the second clad, resulting in many breakages and cracks on the surface of the base material, in extreme cases, in occurring of the cracks even in the first clad, so that the material will be inferior goods. The occurrence of the breakage and the crack is considered to be caused by lost of the balance of stress due to heat shrinkage of the porous glass fine particle layer on the glass rod, which is a target, since the section of the glass rod is not round. Accordingly, if the length of the longest part of the deformed section of the glass rod is kept to be short, the ratio of the length of the peripheral part that is not round in periphery of the deformed section to the length of the periphery of the porous glass fine particle depositing layer gets small relatively, so that heat stress with shrink of the peripheral part that is not round during cooling can be small, and breakage, crack or the like can be prevented from occurring.

The length of longest part L of 15 mm or less can be achieved by drawing the glass rod produced in the above-mentioned step (1) with a glass lathe or the like. The drawing can be conducted before or after the processing of deforming the first clad. (2) Then, the porous glass fine particles made of the same material as the first clad are deposited as the second clad on the glass rod having the deformed first clad to produce a porous glass base material, which is then sintered, vitrified to produce base material for optical fiber on which the second clad is formed.

Since the shape of the section of the glass rod on which the second clad is deposited and vitrified is not circle in most cases, it should be processed to be the second clad having a round section by grinding, polishing or the like in order to be finished as an base material for optical fiber.

In that case, the porous glass base material on which the second clad is deposited may be processed to have a round section, and vitrified to form the second clad having a round section.

If the optical fiber is produced by wiredrawing the base material for optical fiber produced by the processes described above, the quartz optical fiber for amplifying light having the deformed first clad coated with the second clad made of the same material can be produced There are no defects such as cracks in the second clad or the deformed first clad in the optical fiber. Accordingly, high quality, high excitation efficiency of excitation light due to the deformed first clad and high-dower output light can be achieved in the optical fiber.

EXAMPLE

The present invention will be explained with example and comparative examples.

Example

A glass rod was produced according to VAD method, which was then drawn to have a diameter of 3 mm, yielding a core rod. A difference in a refractive index of the core rod was +0.3% (based on pure quartz level).

A glass rod in the region of the first clad was produced according to VAD method, and drilling was conducted to form a hole having an inner diameter of 5 mm at the center of the glass rod. Then, the core rod produced above was inserted in the hole, and then was collapsed on a glass lathe to be unified. As described above, the glass rod having the core/the first clad was produced.

Then, it was drawn to have a diameter of 10 mm, and a part of the glass rod was ground to be linear so that the section may be D-shape. Porous glass fine particles were deposited around the glass rod having a section of D-shape according to VAD method, and was vitrified in an atmosphere of fluorine to yield a glass base material (preform) wherein the second clad was formed. Then the periphery of the preform was ground to have a round section, and was finished to be base material for optical fiber.

Twenty base material for optical fibers were produced by the method, and no crack occurred.

Example 2

A glass rod having a core and a first clad was drawn to have a diameter of 20 mm, and a part of the glass rod was ground to be linear so that the shape of the section may be D-shape. Porous glass fine particles were deposited around each of 20 glass rods having a section of D-shape according to VAD method. Cracks occurred in 20 glass rods all obtained by the conventional method. However, cracks did not occur in 16 of 20 glass rods obtained by the method of the present invention, and thereby the base material for the optical fiber having the second clad with a round section could be produced. In four of them, breakage and crack occurred in a step of cooling the porous glass fine particles after deposition.

The present invention is not limited to the above-described embodiment. The above-described embodiment is a mere example, and those having the substantially same structure as that described in the appended claims and providing the similar action and effects are included in the scope of the present invention.

For example, base material for optical fiber was produced according to VAD method or a rod in tube method. However, the present invention is not limited to such methods, and can be applied to OVD method and MCVD method.

What is claimed is:

1. A method for producing a base material for optical fiber having a deformed first clad consisting of at least a core, a first clad and a second clad, comprising the steps of deforming a shape of a section of the first clad so that it may have at least one linear part when the first clad is formed around the core, processing a length of a longest part of the deformed section of the glass rod having the first clad into 15 mm or less, depositing porous glass fine particles as the second clad made of the same material as that of the first clad on a glass rod having the deformed first clad to form a porous glass base material, and forming the second clad having a round section by vitrifying it.

2. A base material for optical fiber having a deformed first clad produced by the method according to claim 1.

3. An optical fiber having a deformed first clad produced by wiredrawing the base material for optical fiber according to claim 2.

* * * * *